July 20, 1943.  J. R. ORELIND  2,324,870
AGRICULTURAL IMPLEMENT
Filed Nov. 23, 1940  4 Sheets-Sheet 3

Inventor
John R. Orelind
By Paul O. Pippel
Atty.

July 20, 1943.  J. R. ORELIND  2,324,870
AGRICULTURAL IMPLEMENT
Filed Nov. 23, 1940  4 Sheets-Sheet 4
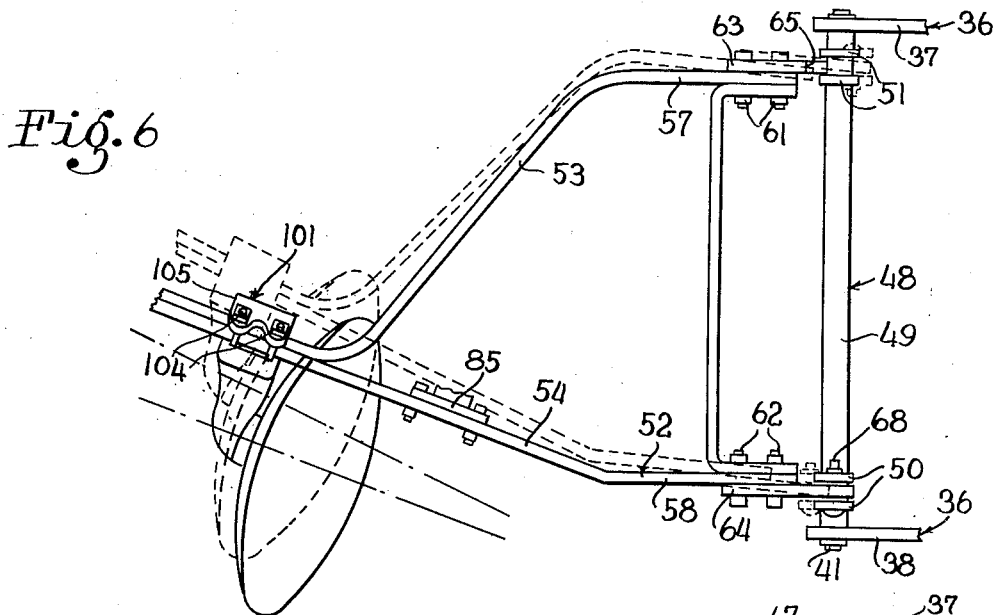
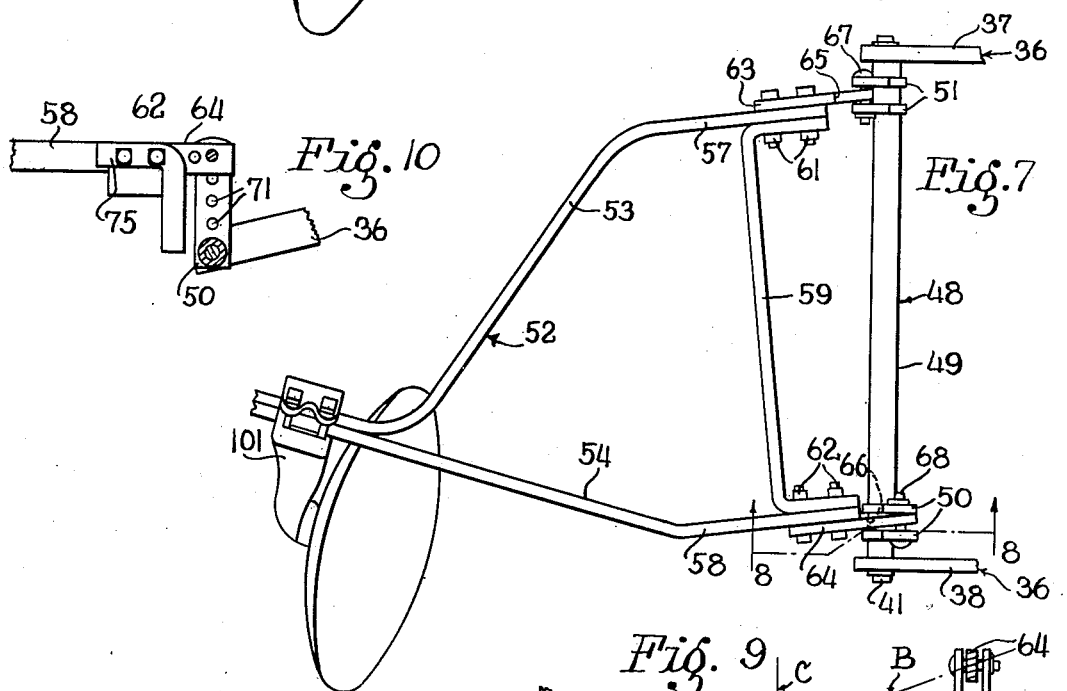
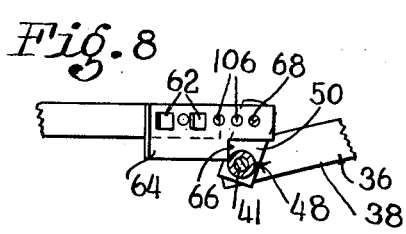
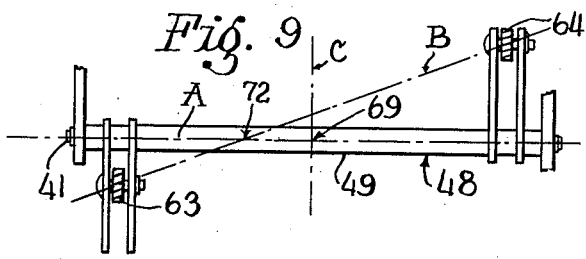
Inventor
John R. Orelind
By [signature]
Atty.

Patented July 20, 1943

2,324,870

UNITED STATES PATENT OFFICE 2,324,870

AGRICULTURAL IMPLEMENT

John R. Orelind, Evanston, Ill., assignor to International Harvester Company, a corporation of New Jersey Application November 23, 1940, Serial No. 366,906

16 Claims. (Cl. 97—47)

This invention relates to agricultural implements of a type which are connected to an implement-supporting means, such as a tractor, so as to be laterally stabilized by the same.

It is the principal object of the present invention to provide a hitch means which is adapted for connection to transversely alined implement-attaching portions of the tractor wherein relatively free lateral movement of the implement is had about an imaginary hitch point and as if the implement were actually connected to but a single implement attaching portion of the tractor.

It is a further object of the invention to provide a novel means for the alinement of the individual working tools with respect to the ground being worked and for alinement of the working tools therewith when the implement frame has been laterally adjusted such as to vary the width of cut to be taken by the tools.

It is still a further object of the invention to provide in the connecting means of the present type means for adjusting laterally the imaginary hitch point to increase or decrease the amount of side draft placed upon the tractor by the implement whereby the effective line of draft of the implement will be conveniently shifted with respect to the central longitudinal axis of the tractor.

According to the present invention, there is provided a connecting arrangement for an implement-supporting means or tractor having only transversely alined portions to which an implement may be connected, which is such that the implement will have substantially free lateral movement with respect to the tractor. This is accomplished by the provision of an equalizer means connected between spaced portions of the implement for rotation about a transverse axis whereby there is effected an imaginary hitch point located somewhere intermediate of the transversely alined portions of the tractor.

The laterally spaced portions of the implement are so connected to the equalizing means that one or the other or both can be extended or adjusted whereby lateral adjustment of the plow frame will be effected to thereby position the working tools so that a narrower or wider cut may be made of the ground being plowed. To further line up the plow tools after this adjustment of the plow frame has been made, there is provided in the connection of the plow standard to the plow frame, a wedge element adapted to be disposed between the clamping portions of the standard with the tool-carrying portion of the plow frame which is of square cross-section. The plow frame is generally and simply comprised of two longitudinally extending side frame pieces which are joined at a location removed from the connection of the spaced portions with the equalizer means to thereby provide the tool-carrying portion of the plow frame.

Associated with the connection of the spaced locations of the implement frame with the equalizer means are provided abutment portions to limit the lateral movement of the implement frame with respect to the tractor. These abutment portions are so arranged as to contact with the equalizer means whereby the equalizer cooperates itself in limiting the lateral movement of the implement frame. The equalizer means takes the form of a sleeve adapted to rotate about a transversely extending axis. The means for connecting the equalizer to the stub axle housing takes the form of a bail having a transverse shaft which extends through the equalizer sleeve. The spaced portions of the implement are respectively connected upon opposite sides of the transverse axis and radially removed therefrom. Adjustment means may be provided so that one of the portions may be connected nearer to the transverse axis than the other, so a shifting of the imaginary hitch point about which the implement swings laterally can be effected. The lateral side draft can thereby be placed on the tractor.

For other objects and for a better understanding of the invention, reference may be had to the following detailed description taken in connection with the accompanying drawings, in which:

Figure 6 is a plan view of a portion of the hitch connection and a portion of the implement frame, and illustrating the normal position and the extreme position to the left to which the plow frame may shift when in operation, the latter position being shown in dotted lines;

Figure 7 is a plan view similar to Figure 6, illustrating the limit of lateral shifting movement of the plow frame to the right;

Figure 8 is a detail view in elevation, taken along the line 8—8 of Figure 7 and illustrating the contact of the abutment portion with the equalizer sleeve to thereby limit the lateral movement of the plow frame to the right;

Figure 9 is a detail elevational view similar to Figure 5, but of a modified hitch connection having adjusting means for the connection of the laterally spaced locations of the implement thereto, illustrating the shifting effect of the imaginary hitch point effected by the adjusting means;

Figure 10 is a detail elevational view of the modified form of hitch connection illustrating the adjusting means and the abutment portion used with this form of hitch means.

Figure 1:
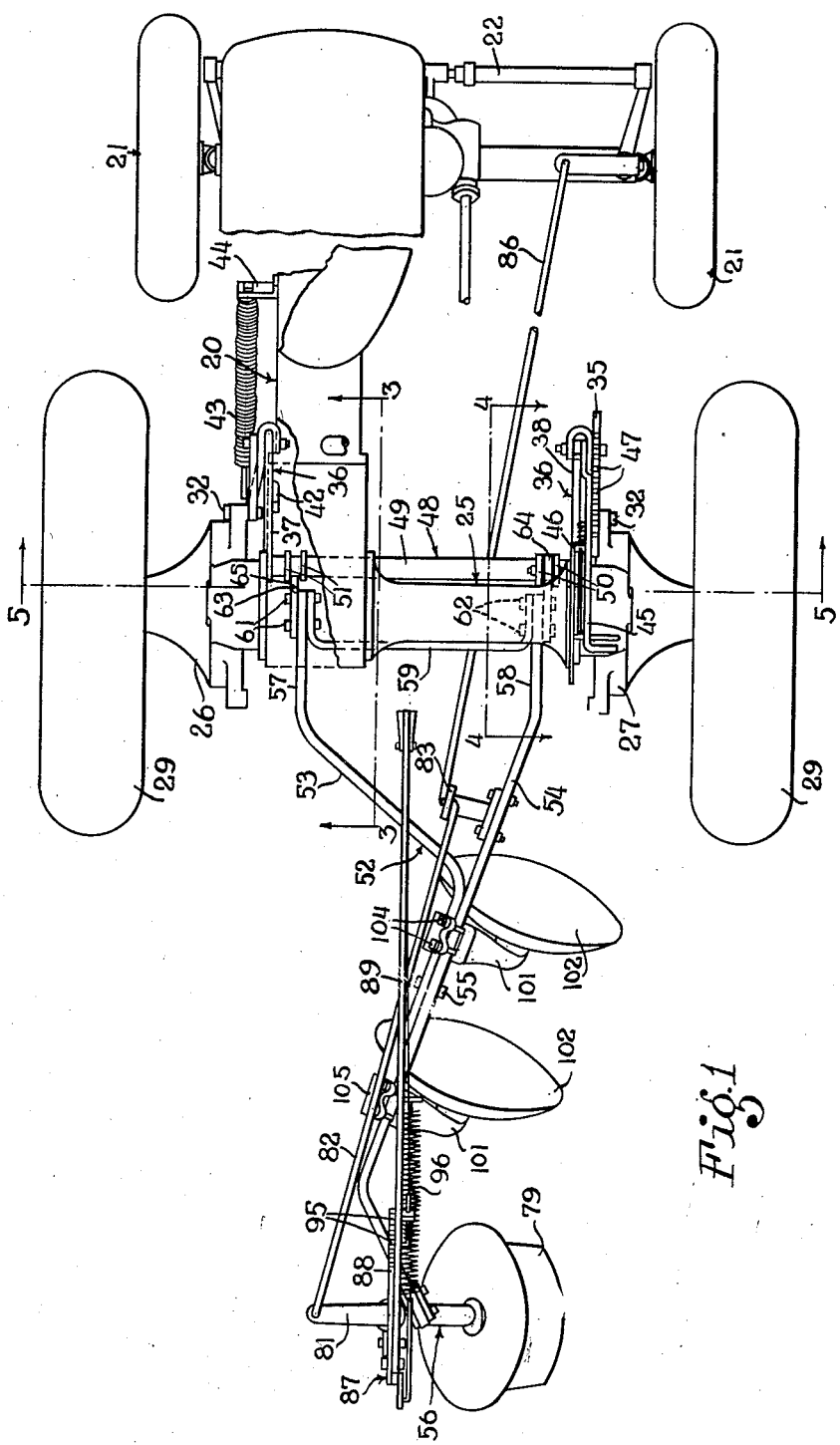
Figure 1 is a plan view of a tractor with a disk plow incorporating the features of the present invention connected thereto.
Figure 2:
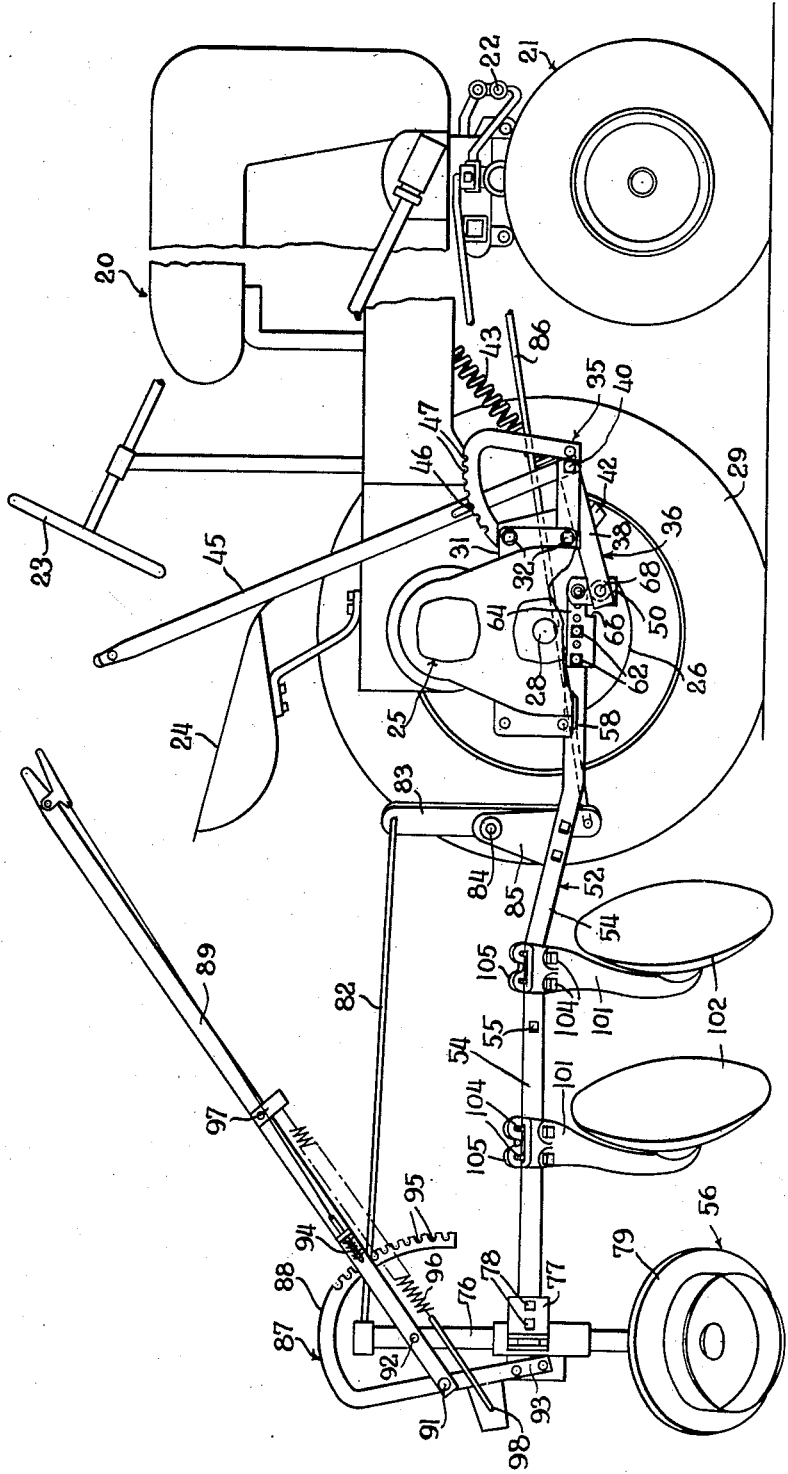
Figure 2 is a side elevational view of the tractor with one rear wheel removed and of the disk plow connected to the tractor.

Referring now to the figures, there is shown a tractor or implement-supporting means 20 having a steerable front wheeled structure 21 adapted to be operated by steering mechanism 22 extending across the front of the tractor. The steering mechanism 22 is in turn controlled by a steering wheel 23 located at the rear of the tractor near to the operator's station 24. The rear portion of the tractor is supported by the rear axle structure, indicated generally at 25 and including respectively the left and right depending stub axle housings 26 and 27. These depending axle housings are transversely alined with respect to each other and provide respectively portions to which an implement frame may be connected. Each of the axle housings include a stub axle 28 to which is respectively connected a rear drive wheel 29.

Figure 3:
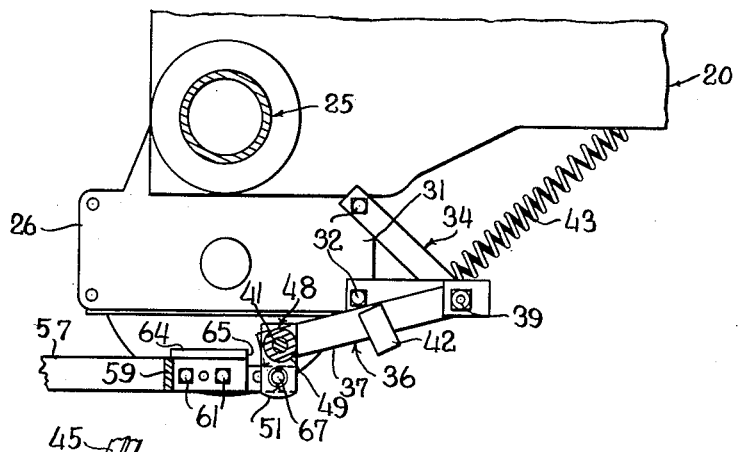
Figure 3 is an elevational view of a stub axle portion of the left side of the tractor and of the implement, taken along the line 3—3 of Figure 1, and looking in the direction of the arrows thereof.
Figure 4:
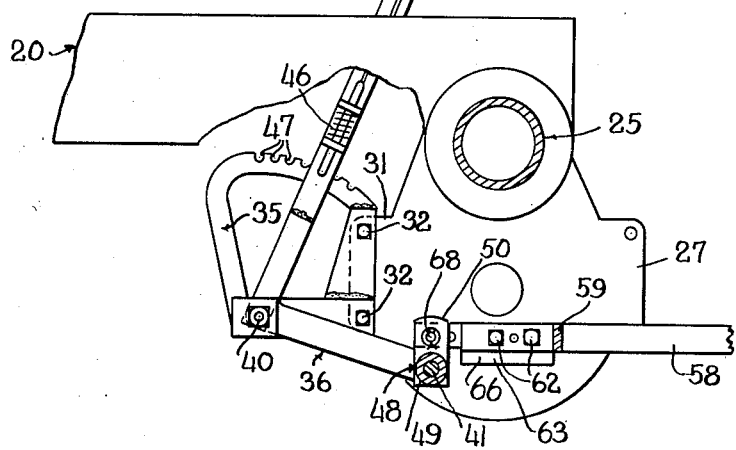
Figure 4 is an elevational view similar to Figure 3, but looking at the stub axle portion at the right or opposite side of the tractor, taken along the line 4—4 of Figure 1 and looking in the direction of the arrows thereof.

Referring now particularly to Figures 3 and 4, there is shown on each of the axle housings an attaching portion 31 having vertically spaced holes adapted to receive the bolt means 32. On the left axle housing 26 there is connected by means of the bolt means 32 a forwardly extending bracket structure indicated generally at 34, while on the right axle housing 27, there is connected a combination bracket and quadrant structure 35. To the forwardmost ends of the respective bracket structures 34 and 35, there is connected a lifting bail or connecting structure indicated generally at 36. This lifting bail structure comprises generally two longitudinally extending arms 37 and 38 respectively pivoted to the bracket structures 34 and 35 as indicated at 39 and 40, and a laterally extending shaft 41 is connected between the free ends of the longitudinally extending arms 37 and 38. On the arm 37 there is connected a U-shaped element 42 extending down and under the bottom of the arm 37 and laterally to the side thereof to provide a connection for a lifting spring 43 fastened to the tractor as indicated at 44. This lifting spring serves to assist in effecting clockwise movement, as viewed in Figure 3, of the bail structure 36 about the pivot connection 39 and 40.

The longitudinally extending arm 38 is rigidly connected as by welding at its pivot end with a vertically extending lever 45 adapted to be adjusted about the quadrant structure 35. The lever 45 carries a detent mechanism 46 adapted for locking engagement with the notches 47 in the quadrant structure 35. When it is desired to effect vertical adjustment of the lifting bail structure 36, the detent mechanism 46 may be operated to unlatch its connection with the notches 47 to permit thereby adjusting movement of the lever 45 over the quadrant 35.

It should now be noted that the depending housing 26 having the attaching portions 31 provides a convenient location for the adjusting mechanism. This location is forwardly of the rear axle structure 25 sufficiently to allow the hand lever 45 to extend upwardly to a location easily available to the operator's station 24.

Figure 5:
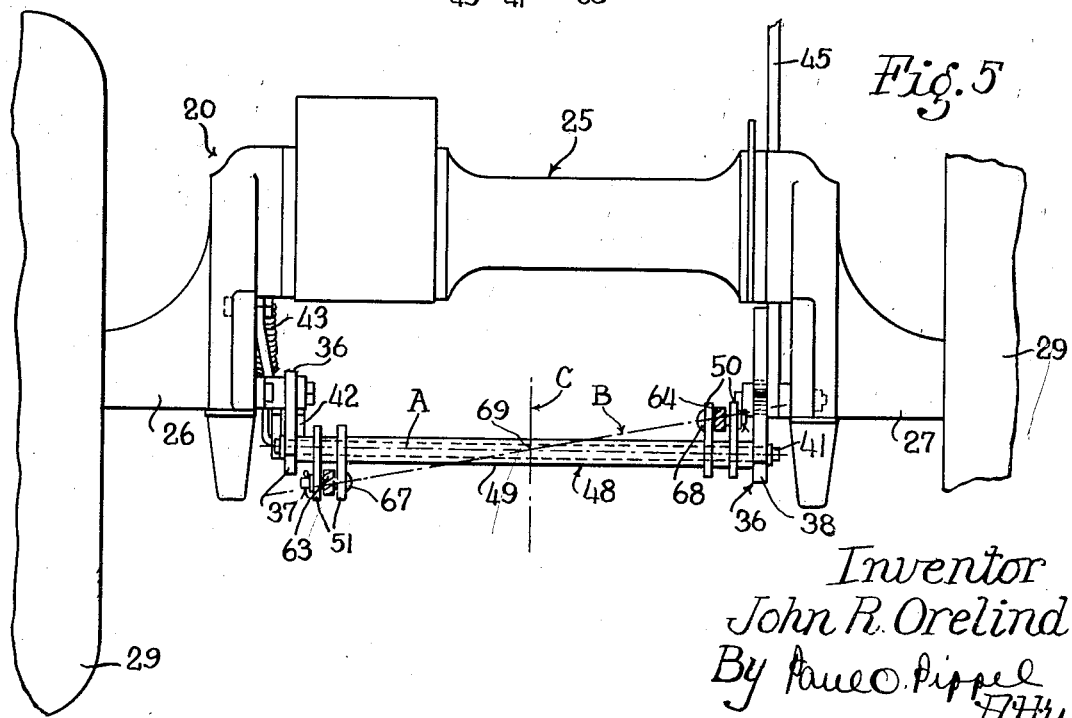
Figure 5 is a rear elevational view of a portion of the rear axle structure of the tractor and of the hitch connection, taken along the line 5—5 of Figure 1.

Carried by the lifting bail 36 is an equalizer means 48. This equalizer means comprises a transversely extending sleeve 49 adapted to surround the shaft 41 of the lifting bail and adapted to be rotated about a transversely extending axis A (Figure 5) and at each end thereof there extends radially and respectively to the opposite sides of the transverse axis spaced pairs of rigidly connected arms 50 and 51. Referring particularly to Figure 5, it will be noted that the arms 50 extend to a location above the sleeve 49 whereas the arms 51 extend to a location beneath the sleeve 49. These arms serve as a means to which the implement frame indicated generally at 52 may be connected.

The implement frame, which in the present instance is that of a frame adapted to carry plow elements, includes generally a pair of longitudinally extending side frame pieces 53 and 54 joined together at 55 to provide a somewhat laterally extending tool-carrying portion intermediate the ends of the implement frame. The cross-section of these individual side pieces 53 and 54 are of such dimension that, when joined together as at 55, there will be provided a tool-carrying portion of square cross-section. The frame piece 54 extends rearwardly beyond the frame piece 53 to provide a portion for the attachment thereto of the ground-supporting means 56. The frame pieces extend forwardly from their union 55 in diverging relationship with respect to each other to provide laterally spaced portions 57 and 58 of the implement frame structure. These spaced portions are laterally braced by means of a transversely extending bracing means 59 connected to the side pieces by bolt means 61 and 62. As a means for connecting these spaced portions 57 and 58 to the equalizer means 48, there are provided longitudinally adjustable attaching pieces 63 and 64 fastened, respectively, by the bolt means 61 and 62 and each of which has respective abutment portions 65 and 66. These pieces 63 and 64 extend forwardly beyond the forward ends of the side pieces 53 and 54 for connection respectively to the arms 50 and 51 of the stabilizer or equalizer means 48. Since there is a pair of arms connected to each end of the sleeve 49, the pieces 63 and 64 will extend respectively between the arms and be there retained, respectively, by bolt means 67 and 68. The spacing of the arms is sufficient to provide a certain amount of looseness to allow for lateral play of the implement frame with respect to the equalizer means. As viewed particularly in Figure 5, it will be noted that the attaching pieces 63 and 64 are located in vertically spaced relation with respect to each other, and that the same extend respectively on opposite sides of the transverse axis A through the equalizer means, about which it rotates.

It should now be apparent that, with the implement frame connected to the equalizer means with its sleeve rotatable about a transversely extending axis A, there will be permitted lateral movement of the implement frame with respect to the tractor, whereby movement or motion received from one side of the implement will be equalized by being imparted to the other side of the implement. Thus, by the use of such an equalizing device, there will be given to the implement in the connection with the transversely alined portions of the tractor an imaginary hitch point located as shown at the intersection 69 of the transverse axis A of the equalizer means and a line B extending between the connections of the attaching pieces 63 and 64 with the respective equalizer arms (see Figure 5). Even though the implement frame is actually connected at two spaced portions to the connecting structure which is in turn connected with the transversely alined portions of the tractor, the implement is still capable of being laterally movable with respect to the tractor, the same as though it were connected actually to a single physical point, such as is common in the connection of implements to tractors when this lateral movement is desired. This point of intersection 69 is ordinarily alined with the center of the tractor, as indicated by the line C in Figure 5.

In order to limit the amount of movement and to prevent its getting out of control and any possible interference of the implement with the tractor structure, the abutment portions 65 and 66 on the respective attaching pieces 63 and 64 will serve to engage with the sleeve of the equalizer between the respective arms 50 and 51 thereof, thereby limiting the amount of lateral movement to one side or the other of the central line of draft of the implement.

Referring now to Figures 6 and 7, it will be noted that the implement, as shown in full in Figure 6, is centrally located in position as when the same is being drawn by the tractor. If the implement frame should move to the left in the direction indicated by dotted lines in Figure 6, the abutment portion 65 on the attaching piece 63 will abut with the equalizer sleeve. When the implement frame turns laterally to the right, as indicated in Figure 7, the abutment portion 66 on the attaching piece 64 will then abut the equalizer sleeve 49, thereby preventing further lateral movement to the right. It should thus be apparent that the attaching pieces 63 and 64 serve not only for the connecting of the spaced portions 57 and 58 to the equalizer, but also the same attaching piece includes an abutment or stop means which engages the equalizer itself to limit movement of the implement frame.

It should also now be apparent that, with the connection of an implement to the tractor in this manner, additional means for the stabilizing of the implement against lateral tilting is unnecessary. The equalizing means, therefore, serves the joint purpose of providing for lateral movement and as well of stabilizing the implement frame against lateral tilting.

Referring now to Figures 9 and 10, there is shown a modified form of equalizer means wherein arms 50 and 51 have respectively a series of holes 71, so that the attaching pieces 63 and 64 can be connected at any one of several locations radially removed from the axis of the equalizer sleeve. This is particularly advantageous when it is desired to have the implement connected to the tractor at a location laterally removed from its center line of draft C. There are occasions when the tractor and implement are operating on a side of the hill that it is desirable to have the implement so connected to the tractor. By having these pieces 63 and 64 adjustable in their connection with the arms 50 and 51, this is effected.

Referring particularly to Figure 9, it will be noted that the line B will now intersect with the transversely extending axis A at 72. Assuming that the line C illustrates the central line of draft of the tractor, it will be noted that the effective hitch point 72 is laterally removed from the central line of draft of the tractor. This will cause the implement to place a side draft on the tractor, but this result is oftentimes desirable, particularly in such instances when the tractor has to travel in plowing along the side of a hill and has to throw the dirt up hill. The side draft on the tractor is then desirable to maintain the working tools in their proper locations in the ground. Since the structure shown in Figures 9 and 10 shows the attaching piece 64 considerably removed from the sleeve 49, it becomes necessary to provide a special abutment means 75 secured by the bolt means 62, as shown in Figure 10, and which is extended sufficiently downwardly to engage with the sleeve 49.

The implement-supporting means 56 comprises a vertically extending shaft 76 adapted to slidably extend through a bracket 77 connected by means of bolts 78 to the frame pieces 54. On the lower end of this shaft 76 is a rear furrow wheel 79. On the upper end of the shaft 76 is a laterally extending arm 81, from which there extends forwardly a rod 82 connected to the vertically extending lever 83 pivoted at 84 to a bracket 85 carried by the side frame piece 54. The lower end of this lever 83 is connected by means of a rod 86 to the steering mechanism 22. The shaft 76 is rotatable in the bracket structure 77; thus the rear furrow wheel 79 is steered by the steering wheel 23.

Since the shaft 76 is slidable vertically through the bracket structure 77, an adjustment of the same may be made by adjusting mechanism 87 comprising a quadrant 88 and adjusting lever 89. The adjusting lever 89 is connected to the quadrant at 91 and to the shaft 76 at 92. The quadrant in turn is connected with the bracket structure 77, as indicated at 93. As the lever 89 is rotated about the point 91, the shaft 76 will be extended through the bracket structure 77. The lever 89 has the usual detent mechanism 94 adapted to cooperate with notches 95 in the quadrant 88. A tension spring 96, connected to the lever 89 at 97 and to the quadrant 98, serves to assist the operator in the working of the lever 89 over the quadrant 88. The lever 89 also extends to a location adjacent the operator's station 24, whereby the same is readily accessible to the operator. By means of the levers 45 and 89, complete control of the implement is had. As the lever is operated, the implement frame is caused to pivot about the contact of the furrow wheel 79 with the ground. If additional height is desired of the implement frame to clear obstructions during transport, the lever 89 is pulled down to effect raising of the rear end of the implement frame.

The tool-carrying portion 55 of the implement frame is, as stated, of square cross-section and extends transversely and at an angle with respect to the line of draft of the entire implement. By extending transversely, it serves as a means to which a pair of disk plow standards 101 may be attached in laterally spaced relationship with respect to each other. On the lower ends of these standards 101 there are respectively connected the usual concavo-convex plowing disks 102 having their concave faces presented to the unplowed ground. Each standard 101 is a solid casting having enlarged holes 103 in the upper end of the same for the passage of the clamping bolts 104, which, with the aid of the clamping plate 105, serve to fix the standards and disk to the transverse tool-carrying portion 55 of the implement.

When it is desired to change the width of the cut of the disks 102, one or both of the attaching pieces 63 and 64 can be respectively adjusted longitudinally along the frame pieces 57 and 58. It will be noted, upon referring particularly to Figure 8, that there are a plurality of holes 106 through which the bolt means 61 and 62 may extend. It is often sufficient that only one of the attaching plates be adjusted. If the attaching piece 64 is adjusted rearwardly along the frame piece 54, the implement frame will assume a position somewhat moved to the right to thereby effect a narrower cutting width.

It should now be apparent that there has been provided, for the connection of implement to transversely alined portions of an implement-supporting means, means wherein a lateral movement of the implement with respect to the implement-supporting means may be had, and that such means is of simple construction and lends itself readily to the provision of a limiting means wherein a part of the connecting means itself cooperates in the limiting of lateral movement of the implement frame.

While various changes may be made in the detail construction, it should be understood that such changes shall be within the spirit and scope of the present invention as defined by the appended claims.

What is claimed is:

1. In combination, a tractor having substantially transversely alined portions, an implement having laterally spaced portions thereon, hitch means for connecting the implement to the transversely alined portions of the tractor for lateral movement with respect thereto including an equalizer means extending between the laterally spaced portions of the implement, and means for connecting the equalizer means between the transversely alined portions of the tractor for rotation about a transverse axis, whereby motion received by one side of the implement will be equalized by being imparted to the other side of the implement thereby effecting an imaginary hitch point intermediate the transversely alined portions of the tractor.

2. In combination, an implement-supporting means having substantially transversely alined portions, an implement having laterally spaced portions thereon, hitch means for connecting the implement to the transversely alined portions of the implement-supporting means for lateral movement with respect thereto including a connecting structure extending between the transversely alined portions of the supporting means, laterally extending equalizer means carried by the connecting structure for rotation about a transverse axis, and means for respectively connecting the laterally spaced portions of the implement to the equalizer means at opposite sides of the transverse axis, whereby motion received by one side of the implement will be imparted to the other side of the implement thereby effecting an imaginary hitch point intermediate the transversely alined portions of the tractor.

3. In combination, a tractor having a rear axle structure with substantially transversely alined depending portions, an implement having laterally spaced portions thereon, hitch means for connecting the implement to the rear axle structure including a connecting structure extending between the transversely alined depending portions of the tractor, laterally extending equalizer means carried by the connecting structure for rotation about a transverse axis, and means for respectively connecting the laterally spaced portions of the implement to the equalizer means at opposite sides of the transverse axis, whereby motion received by one side of the implement will be imparted to the other side of the implement thereby effecting an imaginary hitch point intermediate the transversely alined depending portions.

4. In combination, an implement-supporting means having laterally spaced portions, an implement having laterally spaced portions thereon, hitch means for connecting the implement to the laterally spaced portions of the implement-supporting means for lateral movement with respect thereto including a laterally extending shaft, an equalizer means including a sleeve surrounding the shaft and extending coaxially therewith, and means for respectively connecting the laterally spaced portions to the equalizer means at opposite sides of and radially removed from the transverse axis thereof.

5. In combination, an implement-supporting means, an implement having laterally spaced portions thereon and a ground-supporting means, hitch means for connecting the implement to the implement-supporting means for lateral movement with respect thereto, including an equalizer means extending laterally between the spaced portions of the implement and means for connecting the equalizer means to the implement-supporting means for rotation about a transverse axis to effect thereby an imaginary hitch point, and means for bodily adjusting the equalizer means to effect bodily movement of the implement.

6. In combination, an implement-supporting means having transversely alined portions, an implement having laterally spaced portions and a ground-supporting means, hitch means for connecting the implement to the tractor for lateral movement with respect thereto including an equalizer means extending laterally between the spaced portions of the implement and means for connecting the equalizer means to the implement-supporting means for rotation about a transverse axis to effect thereby an imaginary hitch point, and means for adjustably connecting the equalizer means to the transversely alined portions of the implement-supporting means for vertical movement, whereby the implement may be raised and lowered about its ground-supporting means.

7. In combination, an implement-supporting means having laterally spaced portions, an implement having laterally spaced portions thereon, hitch means for connecting the implement to the laterally spaced portions of the implement-supporting means for lateral movement with respect thereto, including a laterally extending shaft, an equalizer means including a sleeve surrounding the shaft and extending coaxially therewith, and means for respectively connecting the laterally spaced portions to the equalizer means at opposite sides of the transverse axis thereof, and means for bodily adjusting the shaft and equalizer means to effect bodily adjustment of the implement.

8. In combination, a tractor having a rear axle structure, said axle structure having laterally spaced depending stub axle housings, an operator's station located on the rear axle structure, an implement adapted to be connected to the tractor, hitch means for connecting the implement to the tractor including rockable means extending between the depending housings, and manually adjustable means carried by one of the depending housings for rocking the rockable means to thereby effect vertical movement of the implement and including an actuating lever extending to a location near to the operator's station.

9. In combination, an implement-supporting means, an implement comprising an implement frame having laterally spaced portions, a working tool carried by the implement frame, hitch means for connecting the implement frame to the implement-supporting means for lateral movement including an equalizer means connected between the laterally spaced portions of the implement frame, and the connection of at least one of the portions to the equalizer means being adpustable to effect consequent lateral adjustment of the implement frame with respect to the implement-supporting means.

10. In combination, a tractor, a disk plow frame having laterally spaced portions, a plow disk carried by said plow frame, hitch means for connecting the plow frame to the tractor for lateral movement including an equalizer means connected between the laterally spaced portions of the plow frame, and the connections of at least one of the portions to the equalizer means being adjustable to effect lateral adjustment of the disk plow frame.

11. In combination, an implement-supporting means, an implement comprising a frame having laterally spaced portions, a working tool carried by the implement frame, hitch means for connecting the implement to the implement-supporting means for lateral movement including an equalizer means connected between the laterally spaced portions of the implement frame, and adjustable means for connecting one of the portions to the equalizer means, whereby lateral adjustment of the implement frame with respect to the implement-supporting means may be effected, said adjustable means having means associated therewith to cooperate with the equalizer means to limit the amount of lateral movement of the implement frame in one direction.

12. In combination, an implement-supporting means, an implement comprising a frame having laterally spaced portions, hitch means for connecting the implement frame to the implement-supporting means for lateral movement including an equalizer means connected between the laterally spaced portions of the implement frame and means for connecting the equalizer means to the implement-supporting means for rotation about a transverse axis to effect thereby an imaginary hitch point, and means cooperating between the implement frame and the equalizer means for limiting the amount of lateral movement of the implement frame with respect to the implement-supporting means.

13. In combination, an implement-supporting means, an implement having laterally spaced portions, hitch means for connecting the implement to the implement-supporting means for lateral movement including an equalizer means arranged for rotation about a transverse axis, means for respectively connecting the laterally spaced portions of the implement to the equalizer means at opposite sides of the transverse axis, and abutment means on at least one of the spaced portions adapted to cooperate with the equalizer means to limit the amount of lateral movement of the implement in at least one direction.

14. In combination, a tractor, an implement having laterally spaced portions thereon, hitch means for connecting the implement to the tractor for lateral movement including an equalizer means connected between the laterally spaced portions of the implement to rotate about a transverse axis, the connections of the portions with the equalizer means being made on opposite sides of the transverse axis, whereby an imaginary hitch point intermediate the laterally spaced portions is effected, and adjustment means in the connection of one of the portions with the equalizer means, whereby the imaginary hitch point may be laterally adjusted on the tractor to consequently vary thereby the amount of side draft of the implement upon the tractor.

15. In combination, an implement-supporting structure, an implement having laterally spaced portions thereon, hitch means for connecting the implement to the implement-supporting structure for free lateral swinging movement with respect thereto including an equalizer means extending between the laterally spaced portions of the implement-supporting structure and means for connecting the equalizer means to the implement-supporting structure for rotation about a transverse axis, whereby motion received by one side of the implement will be equalized by being imparted to the other side of the implement thereby effecting an imaginary hitch point intermediate the transversely alined portions of the tractor.

16. In combination, an implement-supporting structure, an implement having laterally spaced portions, hitch means for connecting the implement to the implement-supporting structure for lateral swinging movement including an equalizer means connected between the laterally spaced portions of the implement and means for connecting the equalizer means to the implement-supporting structure for rotation about a transverse axis to effect thereby a single imaginary hitch point, and means for limiting the amount of lateral swinging movement of the implement with respect to the implement-supporting structure.

JOHN R. ORELIND.